US009309989B1

(12) United States Patent
Lang et al.

(10) Patent No.: US 9,309,989 B1
(45) Date of Patent: Apr. 12, 2016

(54) FLOW CONTROL DEVICE

(71) Applicant: Lane Enterprises, Inc., Camp Hill, PA (US)

(72) Inventors: Timothy Joel Lang, Forest Hill, MD (US); Patrick X. Collings, Mechanicsburg, PA (US); Douglas K. Graham, Carlisle, PA (US)

(73) Assignee: Lane Enterprises, Inc., Camp Hill, PA (US)

( * ) Notice: Subject to any disclaimer, the term of this patent is extended or adjusted under 35 U.S.C. 154(b) by 257 days.

(21) Appl. No.: 14/069,726

(22) Filed: Nov. 1, 2013

Related U.S. Application Data

(60) Provisional application No. 61/724,033, filed on Nov. 8, 2012.

(51) Int. Cl.
*F16K 33/00* (2006.01)
*G05D 9/02* (2006.01)
*F16K 31/30* (2006.01)

(52) U.S. Cl.
CPC .................. *F16K 33/00* (2013.01); *F16K 31/30* (2013.01); *G05D 9/02* (2013.01)

(58) Field of Classification Search
CPC ............ F16K 31/30; F16K 33/00; G05D 9/02
USPC .......................... 137/397, 398, 409, 428, 448
See application file for complete search history.

(56) References Cited

U.S. PATENT DOCUMENTS

| 706,526 A | 8/1902 | Carlisle |
| 2,569,110 A * | 9/1951 | McGillis ................. G05D 9/02 137/416 |
| 3,073,337 A * | 1/1963 | May ..................... F16K 31/265 137/172 |
| 4,015,629 A | 4/1977 | Morgan et al. |
| 4,224,156 A | 9/1980 | Pardikes et al. |
| 4,796,650 A * | 1/1989 | Hwang .................. F16K 31/26 137/443 |
| 5,232,307 A | 8/1993 | Nouri |
| 5,820,751 A | 10/1998 | Faircloth, Jr. |
| 6,997,644 B2 | 2/2006 | Fleeger |
| 7,052,206 B1 | 5/2006 | Mastromonoco |
| 7,101,114 B1 | 9/2006 | Waters, Jr. |
| 7,125,200 B1 | 10/2006 | Fulton |
| 7,341,670 B2 | 3/2008 | Ghalib |
| 7,459,090 B1 | 12/2008 | Collings |
| 7,762,741 B1 | 7/2010 | Moody |
| 7,790,023 B1 | 9/2010 | Mills |
| 7,985,035 B2 | 7/2011 | Moody |
| 8,021,543 B2 | 9/2011 | Ghalib |
| 8,043,026 B2 | 10/2011 | Moody |
| 2001/0013489 A1 | 8/2001 | Williamson |
| 2010/0284746 A1 | 11/2010 | Moody |
| 2011/0176869 A1 | 7/2011 | Moody |

* cited by examiner

*Primary Examiner* — Mary McManmon
*Assistant Examiner* — Richard K Durden
(74) *Attorney, Agent, or Firm* — Hooker & Habib, P.C.

(57) ABSTRACT

A flow control device includes a float that moves vertically in response to changes in water level, a valve body that moves between extended and retracted positions, and a mechanism interconnecting the float and the valve body wherein changes of position of the float in response to changes in water level changes the position of the valve body. The valve body is placed adjacent a discharge pipe to change the effective intake area of the discharge pipe with changes in water level.

21 Claims, 2 Drawing Sheets

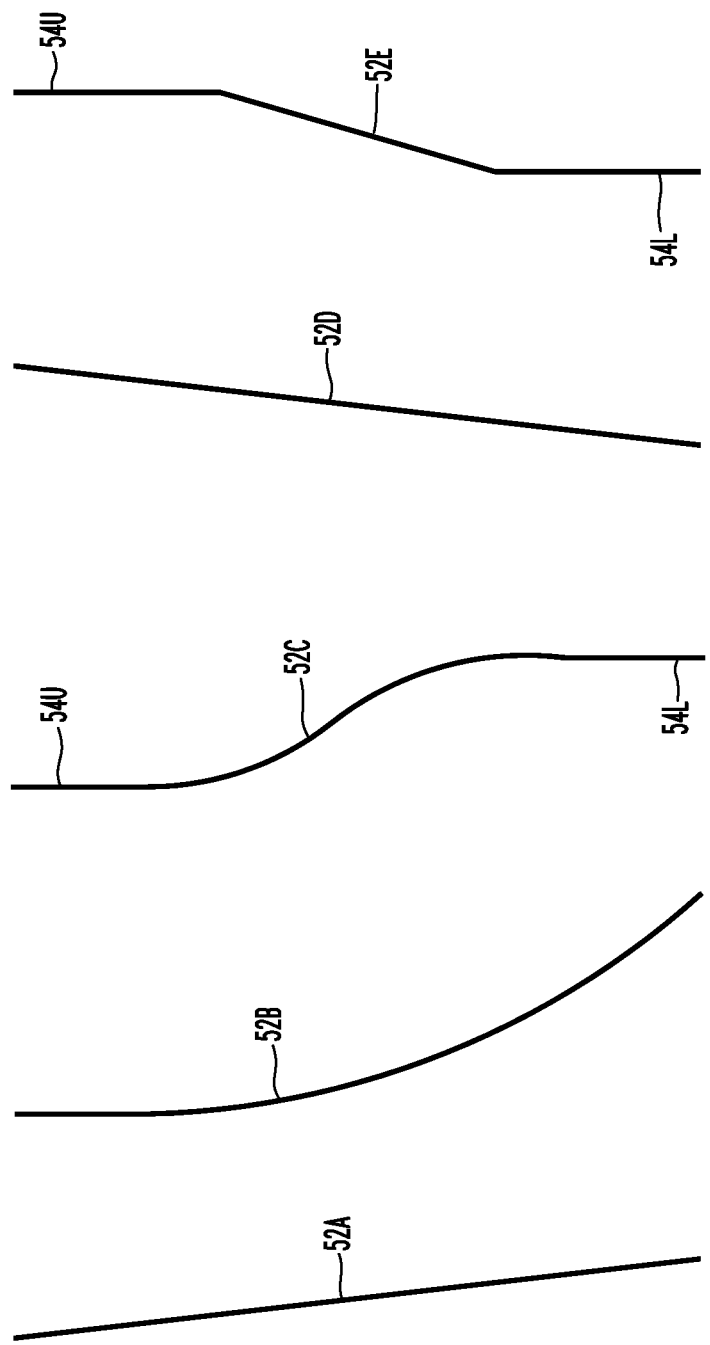

FLOW CONTROL DEVICE

FIELD OF THE DISCLOSURE

This disclosure relates to regulating the flow of water draining from or otherwise discharged from a natural or man-made stormwater storage area such as a stormwater retention basin, sedimentation pond or sedimentation basin, or the like.

BACKGROUND OF THE DISCLOSURE

Stormwater retention basins store water accumulated during a rain event and release the water at a controlled rate to prevent or limit downstream flooding and/or limit downstream waterway erosion.

Some basins have a discharge opening or orifice with a fixed cross sectional flow area located near the bottom of the basin. As the water level in the basin increases during a storm event, the rate of water discharged from the basin (which is essentially proportional to the square root of the water depth) increases with water level. Water is discharged from the basin at a maximum rate when the basin is at its most full condition (which is normally soon after the storm event has occurred).

Stormwater events often cause downstream flooding and also scour sediment from the bottom and sides of waterways. The greater the flow of water, the worse the problem becomes downstream. Site development, which tends to include impermeable surfaces such as parking lots, roofs, and the like, normally acts to increase the rate of site discharge and contributes to downstream flooding and erosion problems.

Typically, all of the sources of stormwater for a given waterway are discharging at their maximum rates during or shortly after a rain event. These sources include underground and aboveground stormwater storage systems, conventional stormwater collection systems, and also overland flows (sheet flows).

It is advantageous to use flow control devices to regulate the discharge of stormwater from stormwater basins and thereby manage the stormwater runoff of the waterway. It may be preferable to have flow control devices with different discharge profiles or discharge hydrographs at different stormwater basins. Some flow control devices may be configured so that the maximum discharge rate from some basins are delayed until after the maximum discharge rate from other basins. Yet other flow control devices may be configured so that the device can better discharge the initial inflow of water and then throttle discharge as the basin fills.

There is a need, therefore, for a flow control device that can be designed to achieve a specific engineered discharge profile.

BRIEF SUMMARY OF THE DISCLOSURE

Disclosed is a flow control device usable for regulating the flow of water draining from or otherwise discharging from a natural or man-made stormwater storage area in which the discharge profile (or outlet hydrograph) can be easily modified.

A flow control device variably throttles the flow of water into an intake opening of a discharge line discharging water from a storage basin. The flow control device includes a float that is vertically movable in response to changes in water level, and a valve member connected to the float for movement with the valve member. The valve member is configured to be placed adjacent the intake opening whereby movement of the valve member in response to movement of the float moves the valve member towards or away from the intake opening. Movement of the valve member variably throttles the flow of water by changing the effective intake area of the intake opening.

The flow control device is preferably configured to vary the area of the intake opening with changes in water level at the intake opening. An embodiment of the flow control device can be configured to increase the area of the intake opening with rising water level and decrease the area of the intake opening with falling water level. Another embodiment of the flow control device can be configured to decrease the area of the intake area with rising water level and increase the area of the intake opening with falling water level. The rate of change of the area of the intake area can also vary with water level to achieve a specific engineered discharge profile.

In an embodiment of the flow control device, the float is disposed in the tubular body of a housing, the tubular body defining the vertical axis of movement of the float. A crank-slide mechanism interconnects the float and the valve body. The crank-slide mechanism includes an elongated crank pivotally attached to the top of the housing and extending into the housing body, a slide attached to the float for conjoint movement with the float, and a guide surface. The valve member is attached to the lower portion of the crank for movement with the crank.

Vertical movement of the float causes the slide to move along the guide surface, rotating the crank and thereby moving the valve member. The valve member is configured to move between extended and retracted positions with movement of the float between raised and lowered positions. The valve member is attached to the crank member so that the extended position occurs when the float is raised, or alternatively so that the extended position occurs when the float is lowered. Variations in the geometry of the valve member and crank-slide mechanism facilitate achieving a specific engineered discharge profile.

A flow control device in one possible discharge profile embodiment is configured to increase the effective intake area of the discharge pipe as the water level in a stormwater basin falls. This delays the peak discharge rate from the basin until after the basin fills with water. A flow control device in another possible discharge profile embodiment is configured to increase the effective intake area of the discharge pipe as the water level in a stormwater basin increases to better match the intake rate into the basin at the beginning of the rain event.

The shape of the guide path can also be modified to further modify the discharge profile of the flow control device.

The disclosed flow control device provides design flexibility for an engineer to obtain discharge profiles that better meet stormwater management system needs or goals.

Other objects and features of the disclosure will become apparent as the description proceeds, especially when taken in conjunction with the accompanying drawing sheets.

BRIEF SUMMARY OF THE DRAWINGS

FIGS. 3A, 3B, 3C, 3D, and 3E illustrate different embodiments of guide surface paths for the crank-slide mechanism of the flow control device shown in FIGS. 1 and 2.

DETAILED DESCRIPTION

Figure 2:
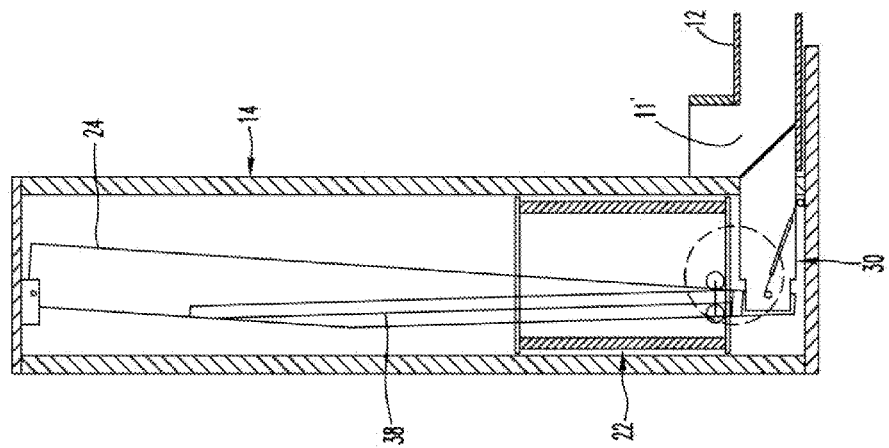
FIG. 2 is similar to FIG. 1 but with the float of the flow control device in a second, lowered float position corresponding to a lower water level.
Figure 1:
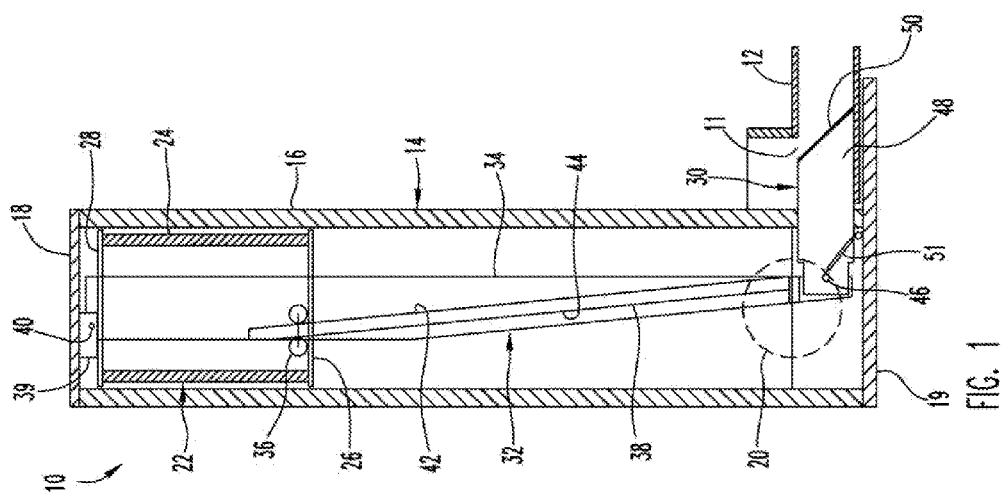
FIG. 1 is a vertical sectional view of a flow control device, the float of the flow control device in a first, raised float position corresponding to a high water level.

FIGS. 1 and 2 illustrates a flow control device 10 used to change the effective intake area of an intake opening 11 of a discharge pipe 12 of a stormwater retention basin as a function of water level in the basin.

The flow control device 10 includes a housing 14 having a generally tubular body 16 that extends along a vertical axis and a top wall 18 closing the upper end of the body 16 and a lower wall 19 closing the lower end of the body 16. Screened inlet openings 20 located near the bottom of the housing 14 fluidly communicate the interior of the body 16 with the basin. Additional openings (not shown) can be provided to also enable venting of air from inside the housing 14.

Disposed inside the tubular body 16 is a float 22. The float 22 is capable of floating in water and is movable in the body 16 along the vertical axis between an upper float position shown in FIG. 1 corresponding to a first, higher water level in the basin and a lower float position shown in FIG. 2 corresponding to a second, lower water level in the basin.

The float 22 includes a tubular body 24 that extends along the vertical axis and closed by end caps 26, 28 that are closely received in the housing body 16.

A valve body or valve member 30 is connected to the float 22 by a crank-slide mechanism 32. The crank-slide mechanism 32 includes an elongated crank 34, a slide 36, and a guide member 38.

The crank 34 is pivotally mounted to the top wall 18 by a pivot block 39 for rotation about a horizontal pivot axis 40 spaced near the upper end of the housing 14. The crank 34 is pivotable about the pivot axis 40 between a first position shown in FIG. 1 and a second position shown in FIG. 2. The crank 34 is a generally planar member that extends from the pivot axis 40 into the housing body 16 substantially the full length of the housing body 16.

Fixed to one or both sides of the crank 34 is the guide member 38. The illustrated guide member 38 is a straight member having a flat upper surface 42 and a flat lower surface 44, the surfaces 42, 44 each oriented perpendicular to the drawing sheet as viewed in FIGS. 1 and 2. The guide member 38 extends along the vertical axis but is inclined or non-parallel with the vertical axis when the crank 34 is in the position shown in FIG. 2 and rotates towards, but does not reach, vertical as the crank 34 pivots to the position shown in FIG. 1.

The slide 36 is fixedly attached to the float 22 for conjoint movement with the float 22. The illustrated slide 36 is attached to the lower end of the float 22 and is spaced closer to the left side of the float 22 as viewed in FIGS. 1 and 2.

The slide 36 receives the guide member 38, with the slide 36 facing the guide surfaces 42, 44. The slide 36 moves along the guide member 38 with vertical movement of the float 22, with the guide surfaces 42, 44 cooperating to define a guide surface that the slide 36 moves along with vertical movement of the float 22. The slide 36 may include roller bearings that engage the guide surfaces 42, 44 to reduce friction between the slide 36 and the surfaces 42, 44.

The slide 36 is adjacent the upper end of the guide member 38 when the float 22 is in the raised position shown in FIG. 1, and the slide 36 is adjacent the lower end of the guide member 38 when the float 22 is in the lowered position shown in FIG. 2.

The valve member 30 is pivotally attached to the lower end of the crank 34 and is movable horizontally with pivotal movement of the crank 34 between the crank positions shown in FIGS. 1 and 2. The valve member 30 is movable with the crank 34 between a retracted position shown in FIG. 1 and an extended position shown in FIG. 2.

The valve member 30 includes an attachment portion 46 that attaches the valve member 32 to the crank 34 and a cylindrical forward portion 48 having a tapered free end 50.

The forward portion 48 is a solid member that does not admit water. The forward portion 48 of the valve member extends out of the housing 14 and cooperates with the discharge pipe 12 to define the area of the intake opening as will be described in further detail below. A spring 51 may be connected between the valve member 30 and the housing 14 urging the valve member 30 to the extended position.

Operation of the flow control device 10 is described next.

The flow control device 10 is located in the basin to extend above the intake end of the discharge pipe 12, and with the valve member 30 facing the intake end of the discharge pipe 12 as shown in FIGS. 1 and 2.

Before a rain event, the water level in the basin is at or below the elevation of the intake end of the discharge pipe 12. The float 22 is in its lowest vertical position in the housing 14 as shown in FIG. 2. The valve member 30 is in its retracted position, thereby defining a relatively large intake area 11' between the valve member 30 and the discharge pipe 12.

During the rain event, the water level in the basin rises above the intake opening. Water enters the housing 14 through the inlet 20, causing the float 22 to begin floating and moving vertically upward with the rising water level. The slide 36 moves vertically along the guide member 38 as the float 22 rises. The slide member 36 engages and presses against the lower guide surface 44. The slide member 36 is a fixed horizontal distance from the pivot axis 40, causing the crank 34 to rotate counterclockwise as viewed in FIG. 2 about the pivot axis 40. As the float 22 rises, angular displacement of the lower end of the crank 34 causes the valve member 30 to move horizontally to the right, moving the valve member 30 from the retracted position shown in FIG. 2 towards the discharge pipe 12 and to the extended position shown in FIG. 1.

As the float 22 rises and the valve member 30 moves towards the discharge pipe 12, the effective intake area of the discharge pipe 12 decreases.

FIG. 1 illustrates the flow control device 10 when the float 22 has risen to the highest possible elevation in the housing 14. The valve member 30 has moved to the extended position closely spaced from the discharge pipe 12. The effective intake area of the discharge pipe 12 is at a minimum.

The vertical position of the float 22 as shown in FIG. 1 corresponds to a higher water level in the basin as compared to the float position shown in FIG. 2. This higher water level may correspond to the water level in the basin when the basin is full, that is, the float 22 reaches the position shown in FIG. 1 when the basin at the same time the basin is full.

Alternatively, the water level in the basin may continue to rise over the housing 14. The float 22 cannot rise any further in the housing 14. The increasing water level may submerge the housing 14. The float 22 cannot rise any further in the housing 14 and so the float 22, the crank 34, and the valve member 30 would remain stationary as shown in FIG. 1. The effective intake area of the discharge pipe 12 remains constant as the water level rises above the housing 14 because the valve member 30 remains stationary.

As the water level falls after reaching its highest, peak water level, the float 22 begins floating and moving vertically downward with the falling water level. Downward movement of the float 22 is delayed if the housing 14 was submerged until the water level falls below the top of the housing.

As the float 22 moves downward with the falling water level, the slide 36 engages against the upper surface 42 of the guide member 38. As the float 22 falls, the crank 34 rotates clockwise as viewed in FIG. 1. Angular displacement of the lower end of the crank 34 causes the valve member 30 to move horizontally to the left, moving the valve member 30 from the extended position shown in FIG. 1 to the retracted position shown in FIG. 2.

FIG. 2 illustrates the flow control device 10 when the float 22 has fallen to the lowest possible elevation in the housing 14. The valve member 30 has moved to the retracted position spaced away from the discharge pipe 12. The effective intake area of the discharge pipe 12 is at a maximum.

The slide 36 engages the lower and upper and lower surfaces 44, 42 of the guide member 38 as the float 22 moves upward and downward in the housing 22. The guide surfaces 42, 44 cooperate to form a guide surface of the crank-slide-mechanism 30 that interacts with the slide 36 in positioning the crank 34. The illustrated guide surface extends along a straight line inclined to the vertical in such a way that continuous vertical movement of the float 22 causes continuous rotation and angular displacement of the crank 34.

The valve member 30 is attached near the free end of the crank 34. The valve member 30 moves essentially horizontally with angular displacement of the crank 34 between the crank positions shown in FIGS. 1 and 2.

The illustrated embodiment of the flow control device 10 increases the intake area of the discharge pipe 12 as the pressure head above the discharge pipe 12 decreases. The illustrated valve member 30 is attached extending away from the crank 34 to the right as shown in FIGS. 1 and 2 so that the valve member 30 moves between retraced and extended positions as the float 22 moves from the lowest vertical position to the highest vertical position. The intake area of the discharge pipe is at a minimum when the float 22 is at the highest float elevation and the intake area of the discharge pipe 12 is at a minimum when the float 22 is at the lowest float elevation.

In other possible embodiments of the flow control device 10, the intake area of the discharge pipe 12 can decrease as the pressure head above the discharge pipe 12 decreases. The valve member 30 can be attached extending away from the crank 34 to the left as shown in FIGS. 1 and 2 to move the valve body 30 from a retracted to an extended position as the float 22 moves from the highest float elevation to the lowest float elevation.

The slope of the guide surfaces 42, 44 engaged by the slide 36, the distance the float 22 moves between highest and lowest float elevations, the relative positions of the pivot axis 40 and the slide 36 determine the relative displacement and direction of the valve member 30 with respect to the relative displacement of the float 22 as the slide 36 moves along the guide surfaces 42, 44. The illustrated guide surfaces 42, 44 are straight and are inclined to the vertical for all operating positions of the crank 34. Thus the valve member 30 continuously moves towards or away from the discharge pipe 12 with continuous movement of the float 22.

FIGS. 3A-3E illustrate possible non-limiting embodiments of the crank-slide mechanism guide path defined by the guide member 38. The guide path defines the relationship between float displacement and valve member displacement. By varying the guide path, one can vary the operating characteristics (discharge profile) of the flow control device for different applications. The guide paths shown in FIG. 3A-3E will be discussed as alternative guide paths for the flow control device shown in FIGS. 1 and 2.

FIG. 3A illustrates a guide path 52A identical to the guide path shown in FIGS. 1 and 2. The guide path is straight and is inclined to the vertical for all operating positions of the crank 34. The valve member 30 continuously moves towards or away from the discharge pipe 12 with continuous movement of the float 22. The displacement of the valve member 30 is approximately proportional to the displacement of the float 22 (there is some non-linearity due to the change in slope of the guide path with rotation of the crank 34).

FIG. 3B illustrates a curved guide path 52B. The slope of the guide path varies continuously along the length of the guide path to define a different relationship between the displacement of the float 22 and the corresponding displacement of the valve member 30.

FIG. 3C illustrates a guide path 52C having upper and lower idle guide path portions 54U, 54L and a curved, central guide path portion 52C. The idle guide path portions are straight guide path portions configured to be parallel with the vertical axis when engaged by the slide 36. Vertical motion of the slide 36 along these idle sections hold the crank 34 stationary so that the valve member 30 remains stationary.

FIG. 3D illustrates a straight guide path 52D that is inclined to the vertical in the opposite direction from the guide path 50A for movement of the valve member 30 between retracted and extended positions as the float 22 moves between lowered and raised positions. The slide 36 would be located on the opposite side of the float 22 from that shown in FIGS. 1 and 2.

FIG. 3E illustrates a guide path 52E similar to the guide path 52D but having upper and lower idle guide path portions 54U, 54L.

While this disclosure includes one or more illustrative embodiments described in detail, it is understood that the one or more embodiments are each capable of modification and that the scope of this disclosure is not limited to the precise details set forth herein but include such modifications that would be obvious to a person of ordinary skill in the relevant art, as well as such changes and alterations that fall within the purview of the following claims.

The invention claimed is:

1. A flow control device for variably changing the effective area of an intake opening submerged under water and responsive to changes in water level in the vicinity of the opening, the flow control device comprising:

a housing, a float, a crank-slide mechanism, and a valve body;

the housing comprising an elongated tubular body extending along a vertical axis, the body having an interior, the interior in fluid communication with the surrounding water when the housing is submerged in water;

the float in the interior of the housing body, the float capable of floating in water and configured to be movable along the vertical axis in response to changes in water level in the housing, the float movable between a first float position corresponding to a higher water level and a second float position corresponding to a lower water level in the housing;

the crank-slide mechanism in the housing, the crank-slide mechanism comprising an elongated crank, a slide, and a guide surface, the crank pivotally mounted to the housing for pivotal movement about a pivot axis, the crank extending into the housing body to a free end portion, the guide surface fixed to the crank and extending along the crank, the valve member connected to the free end portion of the crank for conjoint movement of the valve member with the crank;

the slide attached to the float for conjoint vertical movement with the float, the slide engageable against the guide surface as the float moves between first and second float positions wherein movement of the float between first and second positions causes pivotal movement of the crank about the pivot axis;

the valve member configured and adapted to be placed facing the intake opening whereby movement of the valving member varies the intake area.

2. The flow control device of claim 1 wherein at least a portion of the guide surface is inclined with respect to the vertical axis when said guide surface portion is engaged by the slide.

3. The flow control device of claim 1 wherein the portion of the guide surface that
is in engagement with the slide as the float moves between the first and second float positions is inclined to the vertical axis when engaged by the slide.

4. The flow control device of claim 3 wherein the guide surface is a straight surface.

5. The flow control device of claim 1 wherein one or more portions of the guide surface that is in engagement with the slide as the float moves between the first and second float positions is parallel with the vertical axis when engaged with the slide.

6. The flow control device of claim 1 wherein the slide is spaced a constant horizontal distance from the pivot axis as the float moves between the first and second float positions.

7. The flow control device of claim 1 wherein the valve member extends a first distance out of the housing when the float is in the first float position and extends a second, different distance out of the housing when the float is in the second float position.

8. The flow control device of claim 7 wherein the valve member retracts into the housing as the float moves from the first float position to the second float position.

9. The flow control device of claim 1 wherein the valve member is pivotally attached to the free end portion of the crank.

10. The flow control device of claim 1 wherein the pivot axis is adjacent the float when the float is in the first position.

11. The flow control device of claim 1 wherein the guide surface comprises a first surface that engages the slide as the float moves from the first float position to the second float position and a second surface that engages the slide as the float moves from the second float position to the first float position.

12. A method for variably throttling an intake area of a discharge pipe, having an intake opening submerged under water, in response to changes in water level in the vicinity of the intake opening, the method comprising the steps of:
  (a) placing a float in the water in the vicinity of the intake opening, the float capable of rising and falling between an upper float position when the water level is a first, higher water level and a lower float position when the water level is a second, lower water level;
  (b) engaging a guide surface against the float, the guide surface having a length, the float engaging the guide surface and moving along the length of the guide surface as the float moves between upper and lower float positions;
  (c) displacing the guide surface in response to movement of the float between upper and lower float positions, the displacement of the guide surface being a function of float position between the upper and lower float positions;
  (d) placing a valve member adjacent the intake opening, the valve member and the pipe cooperatively defining the intake area;
  (e) connecting the valve member to the guide surface wherein displacement of the guide surface moves the valve member relative to the intake opening;
  whereby movement of the valve member with respect to the intake opening varies as a function of float position along the guide surface.

13. The method of claim 12 wherein the float comprises a slide member that engages the guide surface and moves along the guide surface.

14. The method of claim 13 wherein the guide surface is located on a guide member having opposite sides, the guide surface on both sides of the guide member, the slide member receiving the guide member and facing both sides of the guide member.

15. The method of claim 12 wherein displacement of the guide surface comprises the step of:
  (f) pivoting the guide surface about a pivot axis.

16. The method of claim 12 wherein the guide surface is fixedly attached to a crank, the crank pivotable about a pivot axis, the valve member connected to the crank for conjoint movement with the crank.

17. The method of claim 12 wherein the float moves along a vertical axis between raised and lowered positions, and the guide surface extends parallel with a straight line inclined to the vertical axis.

18. The method of claim 12 wherein the guide surface is curved along at least a portion of the length of the guide surface.

19. The method of claim 12 wherein the guide surface comprises at least one idle portion wherein the guide surface remains stationary as the float moves along the idle portion of the guide surface.

20. The method of claim 12 wherein the intake area is a first intake area when the float is in the lowered position and the intake area is a second intake area when the float is in the raised position, the first intake area being greater than the second intake area.

21. The method of claim 12 wherein the intake area is a first intake area when the float is in the lowered position and the intake area is a second intake area when the float is in the raised position, the first intake area being less than the second intake area.

* * * * *